Oct. 17, 1967 L. E. RUSSELL 3,347,385
WATER STRAINER
Filed Oct. 6, 1964
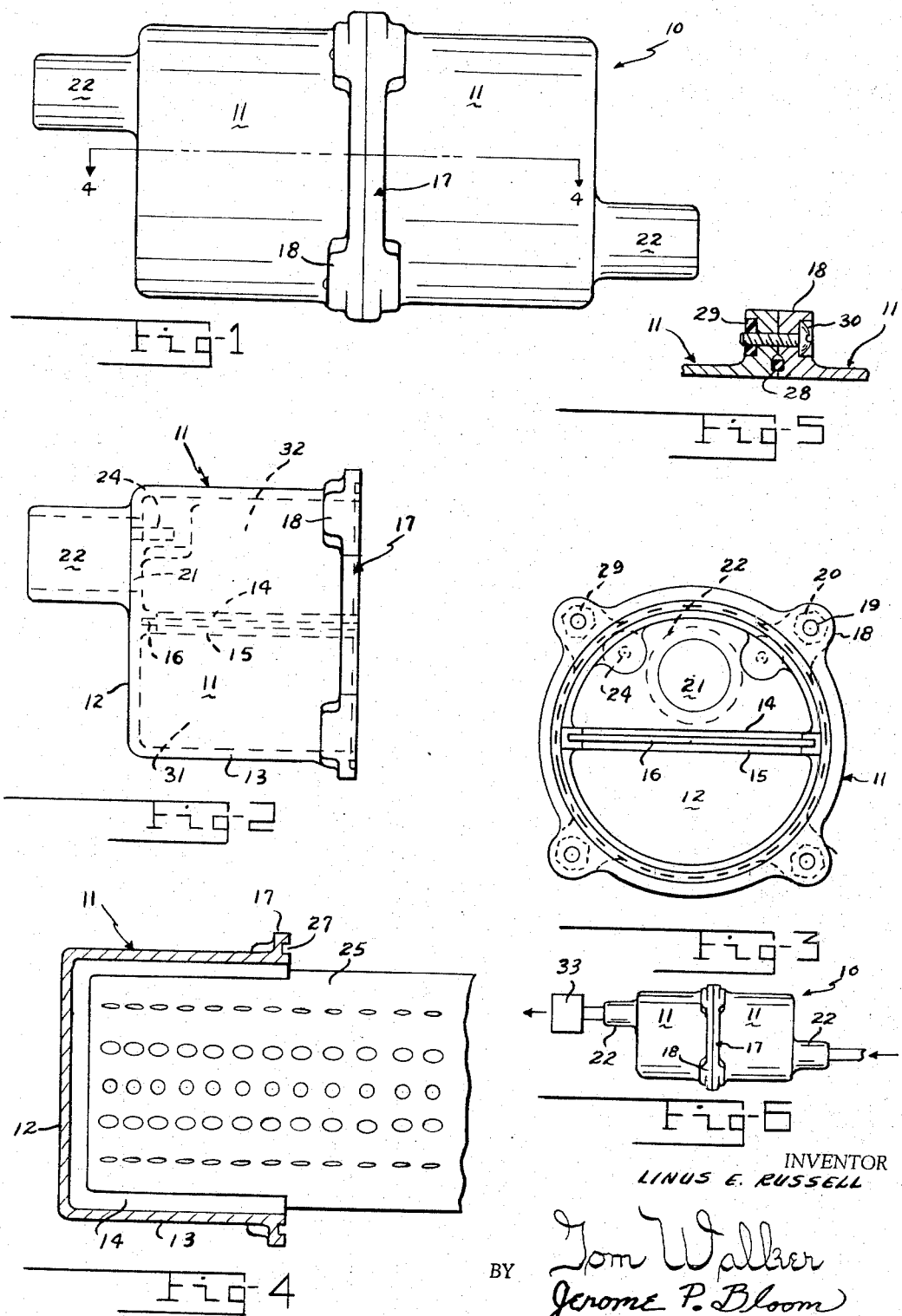
INVENTOR
LINUS E. RUSSELL
BY Tom Walker
Jerome P. Bloom
ATTORNEYS 3,347,385
WATER STRAINER
Linus E. Russell, Springfield, Ohio, assignor to Peters and Russell, Inc., Springfield, Ohio, a corporation of Ohio
Filed Oct. 6, 1964, Ser. No. 401,949
12 Claims. (Cl. 210—232)

ABSTRACT OF THE DISCLOSURE

A strainer device in which housing components cooperate with a contained screen plate to define inlet and outlet chambers for a flowing fluid, the housing components and screen plate having a slidable, guided relation in the assembly thereof.

---

This invention relates to a strainer unit which is exceedingly simple to fabricate, easy to assemble and minimal in cost. Its functional characteristics renders it particularly advantageous for insertion in a fluid supply line.

A primary object of the invention is to provide a novel strainer device which is highly economical to fabricate, most efficient and satisfactory in use, and adaptable to a wide variety of applications.

A further object of the invention is to provide a strainer device of the character described which is composed of essentially three major, slidably related, parts, two of which have an identical form.

Another object of the invention is to provide a strainer unit the simplicity of which insures that its service requirements will be minimal.

Another object of the invention is to provide an inexpensive strainer unit the assembly of which may be achieved in a most unique and simple fashion.

An additional object of the invention is to provide a strainer device which offers particular advantage for marine use.

A further object of the invention is to provide an improved strainer device for insertion in a fluid supply line.

Another object of the invention is to provide a strainer device possessing the advantageous structural features, the inherent meritorious characteristics and the means and mode of use herein described.

With the above and other incidental objects in view, as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment and application of the invention, FIG. 1 is an elevation view of a preferred embodiment of the present invention;

FIG. 2 is a detailed view of a cup element utilized in forming the strainer device of FIG. 1;

FIG. 3 is an open end view of the element illustrated in FIG. 2;

FIG. 4 is a fragmentary sectional view taken on line 4—4 of FIG. 1 with parts removed for clarity of disclosure;

FIG. 5 is a fragmentary sectional view illustrating the interconnection of the cup elements forming the housing in the device of FIG. 1; and FIG. 6 is a schematic view illustrating the strainer of FIG. 1 as incorporated in a water line which leads from a source of supply to the inlet of a suction pump.

Like parts are indicated by similar characters of reference throughout the several views.

Referring to the drawings, the invention embodiment illustrated includes a housing 10 comprised of two identical cup-like sections 11. Each of these sections includes a base 12 rimmed by a peripheral wall 13 of tubular form.

A pair of parallel flanges 14 and 15 are formed integral with and relatively projected from the inner surface of each of the cup elements 11. These flanges lie immediately and respectively to either side of a diametral, longitudinally oriented plane extending perpendicular to and including a diameter of the base 12. As so arranged, the flanges 14 and 15 define therebetween a U-shaped guide slot 16, the respective ends of which terminate in the plane defined by the open end of the cup.

Formed about and integral with the open end of each of the cup elements 11 is a radially projected external flange 17. The flange 17 includes four radially projected ears 18 which are circularly spaced, substantially 90° apart. Each has a central through aperture 19 rimmed by a recessed shoulder 20 in the surface thereof which is remote from the open end of the cup.

To one side of the flanges 14 and 15, the base 12 of each cup has an aperture 21. At the outer surface of the cup, the aperture 21 is defined by a tubular projection 22 formed integral with the base 12.

At two peripheral positions, adjacent and generally radially spaced from the aperture 21, the base 12 of each cup element 11 is relatively thickened to provide for its outermost surface to be formed with a cylindrical pocket 24, the purpose of which shall be further described.

In a preferred embodiment of the invention each of the cup elements 11 is moulded of a clear plastic such as "Tyril," the body of which has a degree of resilience.

While the elements 11 form two major parts of the invention embodiment illustrated, a third is provided by a generally rectangular perforated plate 25. To assemble these parts, first one end of the plate 25 is slidably inserted in the guide slot 16 of one cup element to seat its one extremity to the base 12 and have its other extremity project from the cup. In the example illustrated, one-half of the plate element 25 relatively projects from the open end of the cup. The second cup element 11 is then caused to slidably receive the projected end of the plate 25 in its guide slot 16. This dictates a precise axial alignment of the cup elements, their ears 18, and apertures 19. It also enables a controlled sliding approach of the second cup element relative the first, in the process of which their respective flange elements 17 are caused to relatively abut.

Each of the respectively abutting surfaces of the flanges 17 includes an identically positioned annular recess 27. One of the recesses nests a square cut ring gasket 28 a projecting portion of which is accommodated in the other.

A nut element 29 is snap fit in each of the recesses 20 of the ears 18 on one of the cup elements. Projected through and frictionally related to each of the relatively opposed ears of the second cup element is a screw 30. As the flange elements 17 on the respective cup elements are caused to approach in the slidable mount thereof to the plate 25, each screw 30 is projected through the axially aligned aperture 19 in the opposite ear and rotation of the screws causes them to readily engage the associated nuts 29. Thus, the nature of the cup-like elements 11 and the resilient and frictional containment thereto of the fastening elements 29 and 30 is such to facilitate a ready connection of the flange elements 17, in the process of which the gasket 28 is compressed to form a seal therebetween.

As will be observed from FIG. 1 of the drawings, it is essential that in the mating of the identical cup elements 11 that their projections 22 orient in positions substantially 180° apart. It is to be noted from the drawings that as the cup elements are slidably assembled on the plate 25, the latter, to one side thereof, defines a lower chamber 31 and, to the other side thereof, an upper chamber 32.

In the application of the above described unit in a water supply line as shown in FIG. 6 of the drawings, the tubes 22 are disposed to have a horizontal orientation. This provides that the one tube 22 defines an inlet opening 21 to the lower chamber 31 while the other tube 22 defines an outlet opening 21 from the chamber 32. As may be further observed from FIG. 6 of the drawings, on the upstream side of the strainer unit 10, the supply line incorporates a suction pump 33 in connection with the outlet opening 21. As will be readily obvious, on operation of the pump, water is drawn through the inlet of the strainer 10 and lifted up from a lower to an upper level to exit through the strainer outlet in passage to the pump. As the water is lifted from the lower to the upper level, it moves through the vertically intermediate, horizontally positioned, plate 25. In the process, the longitudinal extent of the perforated plate screens foreign bodies and the latter are inherently caused to separate therefrom under the influence of gravity and fall downwardly to the bottom of the chamber 31. It is to be noted that the bottom of the chamber 31 is below the level of the inlet opening 21. Straining of the fluid is most effectively achieved and there is little, if any, likelihood of any clogging of the perforated plate 25 which would interfere with an effective flow through the strainer 10.

Referring to the pockets 24 in the respective base portions 12 of the cup elements 11, these are provided to facilitate, if required, threaded engagement of screws to the body of the strainer 10 by means of which the strainer may be mounted to structural elements.

In summary the invention provides a uniquely simple construction for a water strainer having features rendering it particularly advantageous for insertion in a fluid supply line. That the invention embodiments may be economically fabricated and simply assembled is believed obvious. The cups 11 may be easily molded, the plate 25 readily cut, and the total is simply assembled. The only care necessary is that the one cup 11 have its tube 22 orient 180° from the other. Note again the simplicity of the means whereby the flange elements 17 may be interconnected to achieve the appropriate seal of the strainer 10 exclusive of the openings 21. The use of a clear as well as resilient plastic facilitates inspection of the invention units when installed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A strainer device consisting of a screen means, two cup-like elements of substantially identical form, means interconnecting said elements to form a housing, each of said elements having means defining an opening in its base, and means interiorly of said elements having in slip fit connection therewith said screen means which bridges said housing in a plane common to said elements and substantially parallel to their longitudinal axes and said screen means being substantialy equal in length to the combined interior lengths of the cup-like elements and forming with said cup-like elements an entrance chamber and an exit chamber each of which includes one of said openings.

2. A strainer device as set forth in claim 1 characterized by said means interiorly of said elements consisting of mating slide guides arranged to slidably receive said screen means on interconnection of said cup-like elements to form said housing.

3. A strainer device comprising two identical cup-like elements each having means defining an opening in its base, means interconnecting said elements with their open ends in abutting relation to form a housing having an interior of longitudinal extent, said openings positioned in relatively offset relation at the remote extremities of said housing and means for slidably relating said elements in forming said housing consisting of means formed on said elements and in connection therewith a perforated plate element having a slip fit to said formed means to extend in a plane common to said elements and substantially parallel to their longitudinal axes and said plate element being substantially equal in length to the combined interior lengths of the cup-like elements and forming with said cup-like elements two chambers, each of which includes one of said openings.

4. A strainer device consisting of a pair of substantially identical cup-like elements interconnected to form a housing which is elongated in a horizontal sense, means securing said cup-like elements together, said cup elements having guide slots formed on their interior surfaces in a plane which bisects their respective base portions and a screen element interfitting in said guide slots in the interconnection of said cup-like elements to facilitate their assembly to form said housing and define thereby a pair of longitudinally extending respectively upper and lower chambers, said screen element being substantially equal in length to the combined interior lengths of the cup elements, and means in the respective cup-like elements to provide an inlet to one chamber and an outlet from the other.

5. A strainer device as set forth in claim 4 characterized by said cup-like elements being formed of a plastic having a degree of resilience, the respective open ends of said cup-like elements which relatively abut in forming said housing including external flanges, the flange in one of said cup-like elements having recesses and affording a snap fit of nut elements in frictionally contained relation thereto and the flange on the other of said cup-like elements having mating portions including through apertures for containing screw elements which interengage with said nut elements.

6. A strainer device consisting of two cup-like elements forming a housing, means for securing said elements together, the inner wall of each of said cup elements including parallel flanges extending from one side to the other, generally coextensive therewith in a plane common to said elements and substantially parallel to their longitudinal axes, a screen plate substantially coextensive in length with the housing interior mounting said elements by engagement thereof between said flanges to produce an assembly of said elements to form in said housing an upper and a lower chamber, each of said elements including an aperture in its base and said apertures respectively positioning in remote ends of said housing, at respectively diametrically displaced positions.

7. A strainer device as set forth in claim 6 characterized by said elements being formed of plastic material having a degree of resilience and including portions which relatively abut in forming said housing having frictionally related connector elements.

8. A strainer device comprising a pair of cup-like elements, means for assembling said elements with their open ends in opposing abutting relation to one another to define a housing with hollow interior, a screen plate installed in said housing, said plate being substantially equal in length to the interior length of said housing and in a plane common to said elements and substantially parallel to their longitudinal axes to divide said interior into upper and lower chambers, said plate and interior walls of said elements having interengaging portions for a slip fit assembly of said elements in an axial approaching motion, and fluid flow openings in said housing communicating with said chambers.

9. A strainer device according to claim 8, characterized in that said means for assembling said elements include circumferentially spaced attachment means on the periphery of said cup-like elements, said screen plate upon being installed in one element guiding the other element in an axial approaching motion in which the attachment means on said elements are aligned.

10. A strainer device, including a pair of cup-like elements assembled with their open ends in opposing abutting relation placing the interiors of said elements in opposed communicating relation to define a closed housing having an interior of longitudinal extent comprised of the combined interiors of said cup-like elements, a screen plate disposed in said housing in a plane common to said cup-like elements and substantially parallel to their longitudinal axes, said plate being substantially coextensive with the housing interior from end to end thereof and from side to side and dividing the housing interior into flow chambers on opposite sides of said screen plate each comprised of communicating portions of the interiors of said cup-like elements, said cup-like elements providing means coacting with said plate to slidably guide said elements in their assembly to said plate, and a fluid flow opening in each cup-like element communicating with a respective flow chamber.

11. A strainer device according to claim 10, characterized in that said cup-like elements are identical and assembled in a relative rotary position of adjustment so angularly displacing said fluid flow openings as to cause them to communicate with the housing interior on opposite sides of said screen plate.

12. A strainer device according to claim 10, characterized by a key and slot communication between said cup-like elements and said screen plate, said cup-like elements being assembled by a relative axial approching motion of said elements sliding relatively to said screen plate and said screen plate enforcing relative rotary positions of said elements so angularly displacing said fluid flow openings as to cause them to communicate with the housing interior on oppoiste sides of said screen plate.

References Cited

UNITED STATES PATENTS

| | | | |
|---|---|---|---|
| 1,367,783 | 2/1921 | Krumwiede | 210—451 X |
| 1,475,577 | 11/1923 | Green | 210—445 X |
| 1,608,966 | 11/1926 | Tanaka | 210—443 X |
| 2,124,244 | 7/1938 | Chernosky | 210—445 X |
| 2,606,662 | 8/1952 | Dyer | 210—451 |
| 3,002,870 | 10/1961 | Belgarde et al. | 210—446 X |

SAMIH N. ZAHARNA, *Primary Examiner.*